United States Patent
Begeja et al.

(10) Patent No.: US 8,346,594 B2
(45) Date of Patent: Jan. 1, 2013

(54) COMPREHENSIVE INFORMATION MARKET EXCHANGE

(75) Inventors: Lee Begeja, Gillette, NJ (US); David C. Gibbon, Lincroft, NJ (US); Paul van Vleck, Austin, TX (US)

(73) Assignee: AT&T Intellectual Property I, Atlanta, GA (US)

( * ) Notice: Subject to any disclaimer, the term of this patent is extended or adjusted under 35 U.S.C. 154(b) by 478 days.

(21) Appl. No.: 12/206,809

(22) Filed: Sep. 9, 2008

(65) Prior Publication Data

US 2010/0063863 A1    Mar. 11, 2010

(51) Int. Cl.
G06Q 10/00 (2006.01)
G06Q 30/00 (2006.01)
G06Q 20/00 (2006.01)

(52) U.S. Cl. ............. 705/7.32; 705/7.29; 705/7.34; 705/7.39; 705/20

(58) Field of Classification Search ........ 705/7.11–7.42, 705/20
See application file for complete search history.

(56) References Cited

U.S. PATENT DOCUMENTS

| | | | |
|---|---|---|---|
| 7,072,858 B1 * | 7/2006 | Litzow et al. | 705/7.35 |
| 7,512,558 B1 * | 3/2009 | Elad et al. | 705/37 |
| 2001/0047286 A1 * | 11/2001 | Walker et al. | 705/9 |
| 2002/0111816 A1 * | 8/2002 | Lortscher et al. | 705/1 |
| 2003/0004743 A1 * | 1/2003 | Callegari | 705/1 |
| 2004/0111360 A1 * | 6/2004 | Albanese | 705/38 |
| 2004/0153908 A1 * | 8/2004 | Schiavone et al. | 714/712 |
| 2005/0049937 A1 * | 3/2005 | Sanders | 705/26 |
| 2007/0219865 A1 * | 9/2007 | Leining | 705/14 |
| 2007/0276710 A1 * | 11/2007 | Hudgeon et al. | 705/7 |
| 2007/0282677 A1 * | 12/2007 | Carpenter | 705/14 |
| 2009/0027223 A1 * | 1/2009 | Hill | 340/686.6 |
| 2010/0082237 A1 * | 4/2010 | Black | 701/207 |
| 2010/0161718 A1 * | 6/2010 | Soelberg et al. | 709/203 |
| 2012/0046994 A1 * | 2/2012 | Reisman | 705/7.29 |

OTHER PUBLICATIONS

Harmon, "Marketing Information Systems" (2003) Encyclopedia of Information Systems, vol. 3, p. 137-151.*

* cited by examiner

*Primary Examiner* — Lynda Jasmin
*Assistant Examiner* — Sujay Koneru

(57) ABSTRACT

Systems and techniques for collecting information as authorized by information providers and sharing the information with information recipients according to criteria specified by the information providers. Information is collected from one or more of a variety of sources and stored in a provider profile, with the provider profile also specifying criteria for sharing the information, including payment required for sharing the information with particular categories of recipients. An exchange system is maintained allowing recipients to request or to otherwise specify needs for particular categories of information and payments to be provided by the information, and needs or requests of recipients for information are matched with criteria specified by providers, with information being transferred or used to provide results for a recipient and payment being transferred from the recipient to a provider or providers when a match between information needs and criteria for sharing information is identified.

20 Claims, 3 Drawing Sheets

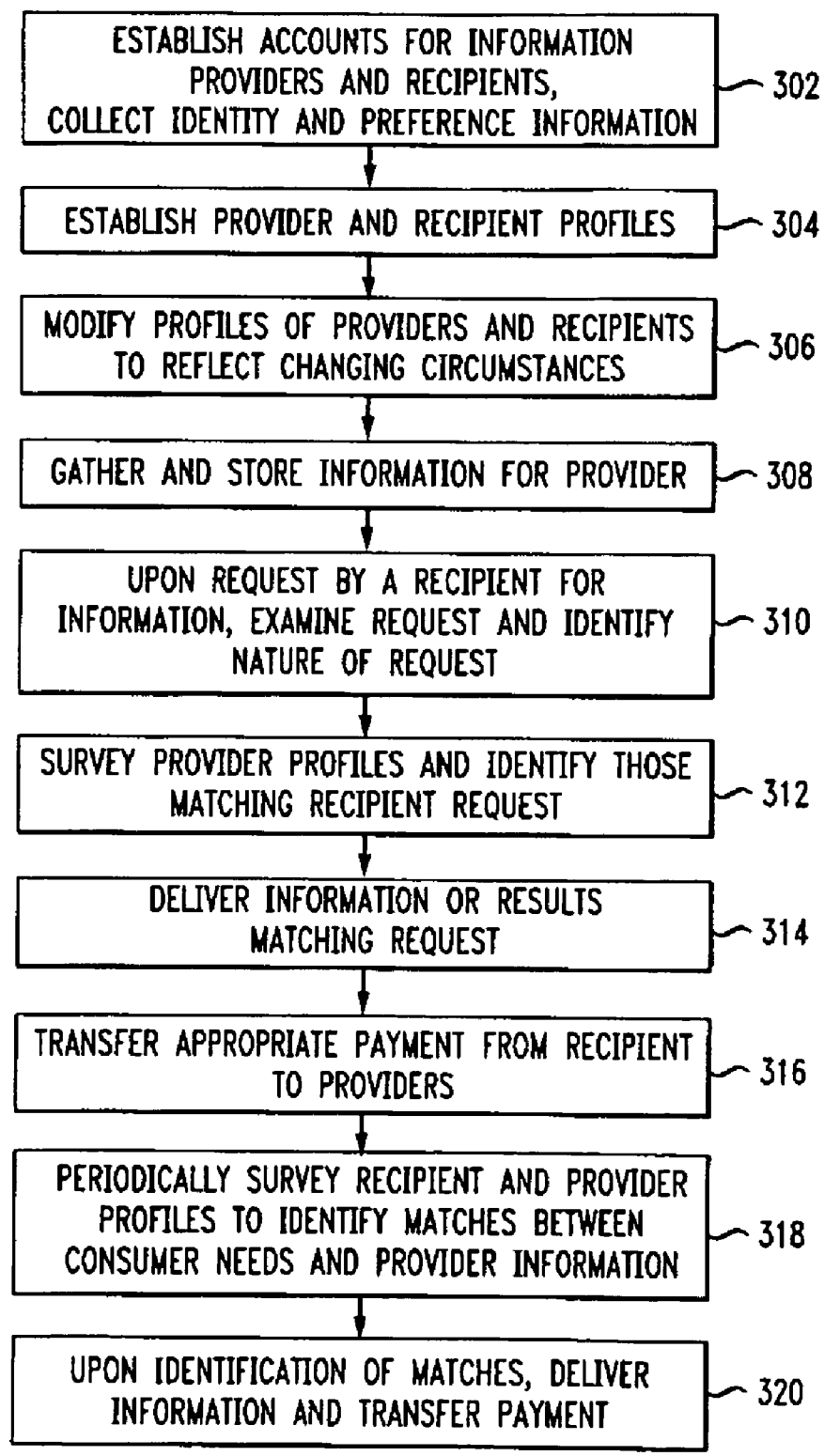

COMPREHENSIVE INFORMATION MARKET EXCHANGE

FIELD OF THE INVENTION

The present invention relates generally to improved systems and techniques for collecting and sharing information. More particularly, the invention relates to improved systems and techniques for collecting information relating to the conditions and activities of users, classifying the information, and providing mechanisms for trading the information for value.

BACKGROUND OF THE INVENTION

Individuals living in present day society are the focus of large amounts of information relating to their conditions, their choices and activities, and the environments and experiences they encounter, and additional information not specifically focused on individual persons, but related to environments in which individuals find themselves, is constantly gathered and made available to individuals. Consumers provide information needed to engage in commerce, such as personal and financial information needed to open and maintain deposit and credit accounts. The act of conducting a transaction involves the collection of relevant information needed to conduct the transaction, including the items involved, the amount paid for the items, the method of payment, the establishment from which the items were purchased, the location of the establishment, whether the items were taken or delivered. Information collected from automated toll devices provides information relating to travel patterns. Many travelers and hikers employ global positioning system (GPS) receivers, and the use of a GPS receiver gives continuously updated information about a traveler's or hiker's location. Weather information for various locations is gathered by numerous organizations and made available to interested parties. User activities with respect to entertainment and online services involve the collection of information necessary to provide the service, and also involve the exchange of information in conducting online activities, for example, navigating to various sites, making online purchases, shopping for goods and services, and engaging in online social networking activities. Medical information, education information, employment information, and a whole host of other types of information are collected and used in connection with transactions and activities of individuals. In addition, much information relating to activities and conditions of individuals is not collected. For example, the impressions individuals form of movies they watch, restaurant meals they eat, food they purchase, points of interest they visit, and other information relating to their experiences is typically not stored and is not shared with others except in a sporadic way.

SUMMARY OF THE INVENTION

Among its several aspects, the present invention recognizes that the information surrounding individuals as they go about their daily activities has value. The information has value in facilitating the activities of the individuals, and much of it would have value to others if properly managed and shared. Information relating to the financial condition and purchasing habits of individuals might have considerable value to vendors who wish to direct sales and advertising efforts. Online activities such as social networking may give insight into a user's similarities and dissimilarities with other users, providing insight into the types of consumers who are likely to share the user's preferences and engage in similar activities. An individual's impressions of food, entertainment, activities, and purchased goods might be useful to others contemplating activities and purchases similar to those of the individual, and to vendors and advertisers trying to predict the reception of their goods and services in the marketplace. The environment encountered by an individual may be expected to influence the individual's needs at the moment. Cold weather, for example, will tend to increase the likelihood that an individual will purchase outerwear, and examining the individual's purchases and activities in connection with environmental information will give insight into the influence of various environmental conditions on that particular individual. Individuals guard the privacy of their information more or less closely, but are likely to be willing to share considerable information if they can achieve some benefit from sharing the information and if their privacy concerns and needs for control over their information can be met.

In one aspect, therefore, the invention provides convenient mechanisms for collecting information relating to users who may be termed information providers and for sharing that information in ways acceptable to the providers. Various collection mechanisms gather information and consolidate that information into one or more records relating to an information provider in connection with whom the information was collected, and the records of numerous information providers may be held in a centralized information exchange accessible to the information providers by and in connection with whom information is collected. The information exchange may also make information accessible to users who may be termed information recipients. Information recipients may be defined as persons and organizations having an interest in receiving portions of that information or guidance or direction relating to the information.

An automated information manager organizes the information and identifies information as belonging to various categories, with one of the categories relating to the sensitivity of the information. An information provider whose information is stored may be given the ability to control the levels of access to information that may be granted to different users and categories of information recipients, and may assign different sensitivity levels to different categories of information. The information provider may also be given the ability to establish criteria for assigning information to categories, to set criteria for assigning sensitivity levels to categories, to reassign elements of information to different categories from which they might have been automatically assigned, and to manually set sensitivity levels for different categories or for individual elements of information.

The information manager further provides a marketplace for the exchange of information, with information providers having the option to furnish information to categories of information recipients in exchange for payment in money or other forms of value. Part of the determination of sensitivity of information and access levels granted to categories of information recipients may involve setting prices for the information. Information may be stripped of personally identifiable information or may otherwise be processed so that it cannot be associated with an individual and may be provided to information recipients employing the information as part of a statistical analysis or for other uses involving information received typically from multiple information providers, with such use typically being independent of the identity of the provider. Alternatively, information may be provided to information recipients without removal of identifying data if such use is acceptable to the information provider. Different pricing may be applied to information elements depending on whether personally identifiable information is included, with a higher price typically prevailing if such personally identifiable information is not included.

Pricing of information may be set by bidding, with the information manager matching bids between providers and recipients, with transactions being concluded automatically or depending on final acceptance by a provider, depending on provider preferences. Numerous additional mechanisms for managing the furnishing of information from providers to recipients may be employed, with examples of these being discussed in greater detail below.

A more complete understanding of the present invention, as well as further features and advantages of the invention, will be apparent from the following Detailed Description and the accompanying drawings.

BRIEF DESCRIPTION OF THE DRAWINGS

FIG. 3 illustrates a process of information collection and exchange according to an aspect of the present invention.

DETAILED DESCRIPTION

Figure 1:
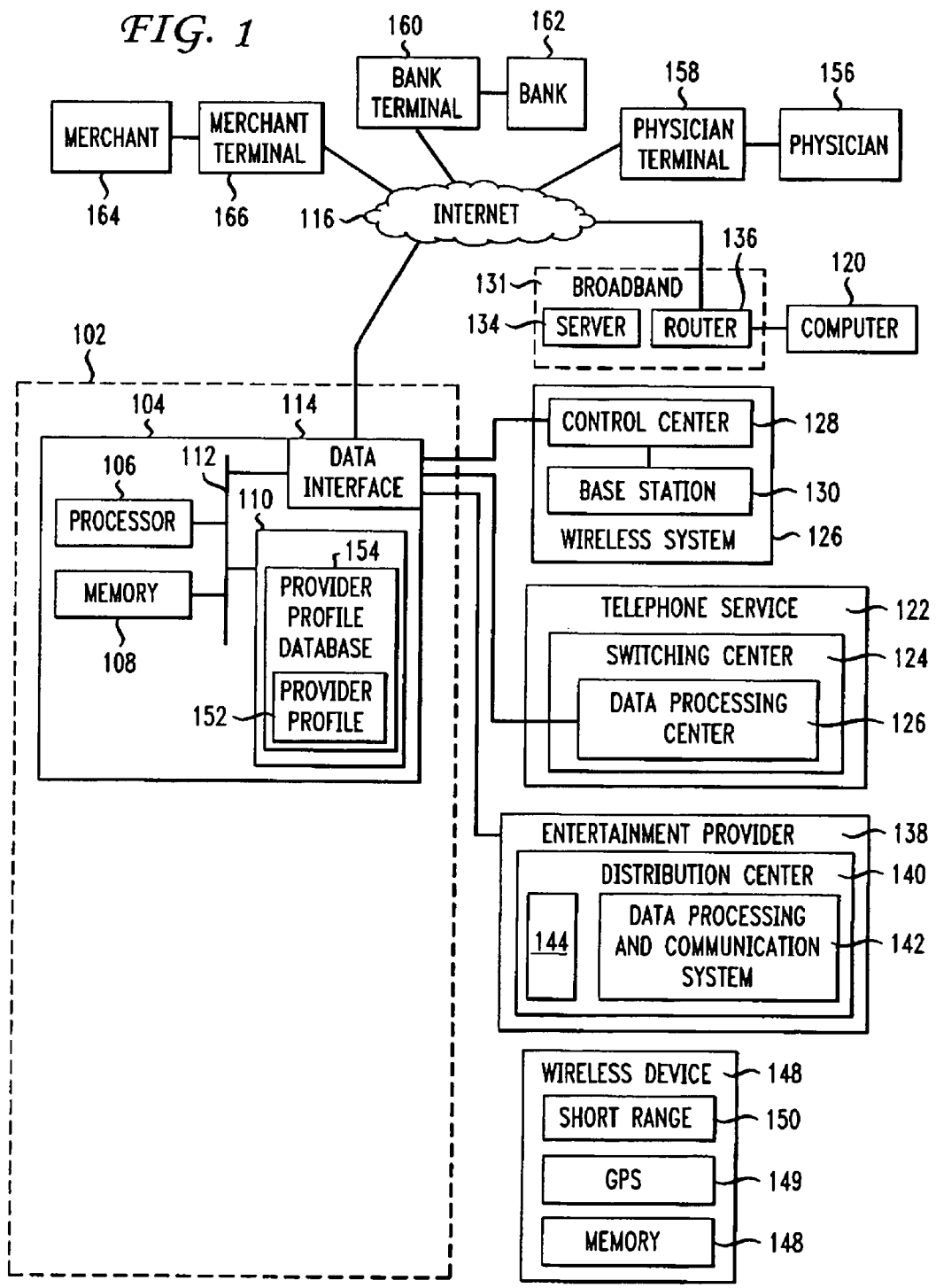
FIG. 1 illustrates a system for collecting and storing information for exchange according to an aspect of the present invention.

FIG. 1 illustrates a system 100 for collecting and storing information according to an aspect of the present invention. The system 100 includes an information management center 102, comprising one or more servers such as the server 104. The server 104 includes a processor 106, memory 108, and storage 110, communicating over a bus 112, with the server 104 being accessible to external devices through a data interface 114. The data interface 114 provides access to the public Internet 116. The information management center 104 is accessible to numerous users, both information providers and information recipients, with the information management center providing mechanisms for information providers to store and classify information and for each class of user to specify circumstances under which information may be exchanged. An information provider may initiate contact with the information management center 102 through a computer 120, communicating with the information management center 102 through the Internet 116.

The information management center 102 may furnish the information provider with a provider interface, describing the various types of information that may be collected and the uses to which they may be put, and may finish the information provider with various mechanisms for classifying and specifying sharing criteria for different elements of information. The information management center may suitably receive information from a number of sources, such as service providers whose customer is a user of the information management center 102.

Such service providers may include a telephone system 122 comprising a switching center 124 employing a data processing center 126, a wireless communication system 127 employing a control center 128 controlling one or more base stations such as the base station 130, a broadband provider 131 comprising one or more servers such as the server 134 and one or more provider routers such as the router 136, and an entertainment provider 138, comprising a distribution center 140 which may in turn comprise a data processing and communication system 142, communicating with user equipment and with the information management center 102 through a data interface 144.

The various service providers may be operated by or in cooperation with an entity maintaining the information management center 102, and which may furnish information to the information management center 102 under the conditions specified by the various information providers who are their customers. Appropriate permissions may be directly furnished by the information provider to the various service providers, or may be conveyed by the information management center 102 to the various service providers.

Information that may be routed to the information management center 102 includes information relating to online activities of providers. Such activities may include activities such as shopping, online entertainment, social group membership. Further activities may include access to information sites, such as news, commentary, and entertainment and sports news, and instant messaging. These sorts of information reflect interests of providers and may be useful for marketing efforts directed to a provider, and also help to classify the provider as belonging to various demographic classifications, lending insight into the extent to which the provider's activities and preferences are predictive of the activities and preferences of others.

A provider's use of entertainment services provides information reflecting the provider's choices and preferences in entertainment, and a provider's wired and wireless communication activities reflects the provider's social and business contacts. In addition, a great deal of online and entertainment activity is carried out through wireless communications, and information relating to wireless communication activities may provide additional sources of information similar to those provided by the provider's use of broadband and entertainment services.

A great deal of information may also be obtained if a provider can track his or her day to day movement and activities. A provider's day to day travels, purchases, and other behavior provide significant insight into his or her interests and desires, and the provider's impressions of his or her experiences can be used to predict the interests and behavior of the provider and other similarly situated persons. The system 100 may therefore suitably employ a mobile device allowing a provider to track his or her movements and activities. Such a device may be a suitably configured mobile wireless device 146. Such a wireless device 146 may communicate with the control center 128 through the base station 130, with the control center 128 transferring appropriate collected information to the information management center 102. The wireless device 146 may store information onboard, for example, in memory 148, and may transfer the stored information to the control center 127 automatically or upon direction of the provider. Alternatively, the wireless device 146 may provide for a connection with a computer such as the computer 120, which may retrieve the information from the memory 148 and transfer the information to the data management center 102.

The wireless device 146 may suitably include a global positioning system (GPS) receiver 149 and a wireless short range communication element 150, which may suitably provide for Bluetooth communication, infrared communication, or other short range communication, and may also provide for a wired connection to a data processing device such as the computer 120. The wireless device 146 may engage in short range communication with suitably equipped transaction terminals to complete transactions or to log transactions completed by other means. The wireless device 146 may also provide appropriate user interfaces allowing a provider to track his or her activities. For example, a provider may enter transactions through an appropriate user interface, recording activities engaged in, places visited, purchases made, and other information. The wireless device 146 may also record ratings of goods purchased, services received, and experiences. For example, an information provider may visit a restaurant and may record the purchase of meals and drinks using the wireless device 146. If the restaurant is suitably equipped, the wireless device 146 may be used for order and payment, and the various items ordered may be recorded. After the meal, the provider may use the wireless device to rate one or more aspects of the meal, such as the quality of each item, the service, the overall dining experience and other relevant aspect. Such information may be recorded and stored in the memory 148.

The GPS receiver 149 may operate to track the provider's position and the wireless device 146 may record the establishments visit by the provider based on the provider's stopping at locations of the establishments. Information recorded may include the name and nature of the establishment, date and time of visit, and duration of visit. This information may be useful in and of itself and may also be used by applications stored in the wireless device 146, the computer 120, or another appropriate data processing device, to remind the provider that he or she has visited an establishment and to request or provide further information about the establishment. For example, if a provider has visited a restaurant but has not used the wireless device 146 to record and rate a meal, an appropriate application may remind the provider that he or she has visited the restaurant and ask if the provider wishes to record and rate the meal.

Information from the various sources is suitably stored in a provider profile 152, which may be hosted in the storage 110 of the server 104. As discussed in greater detail below, storage of information for a provider is subject to conditions set by the provider, either through acceptance of automatically assigned conditions or through explicit designation of conditions. Conditions may control whether particular information is stored at all, how long the information may be held, or how the information is shared. A single provider profile 152 is illustrated here for simplicity, but it will be recognized that the profile 152 may be one of a number of profiles, one for each of a large number of providers, with all of the profiles suitably stored in a database 154.

Requests for relevant information taken from provider profiles, such as the profile 152, may be made by users referred to as information recipients. Information recipients may be persons known to the provider, or members of social or online groups of which the provider is a member. Still other recipients may include persons or organizations rendering services to the provider, or having an interest in marketing goods or services to the provider. Such persons or organizations may also have an interest in learning about the provider's activities and interests so as to inform their development of goods or services or directing their marketing efforts.

Numerous other categories of information recipients may exist and may be served by the system 100. An exemplary recipient may be the provider's physician 156, gaining access through a physician terminal 158. Still another recipient might be a bank 160 having a relationship with the provider, gaining access through a bank terminal 162. Another recipient might be a merchant 164 wishing to sell products to the public, and having an interest in gaining information about the preferences of members of the public, gaining access through a merchant terminal 166. These parties and others gain access to the provider's information in ways controlled by the provider, and may participate in a marketplace for information associated with various providers, as discussed in greater detail below. Some of these recipients, such as the bank and the physician, may also act as sources of information relating to providers, directly furnishing relevant information for inclusion in a provider's profile, according to instructions of the provider and under conditions set by the provider.

Figure 2:
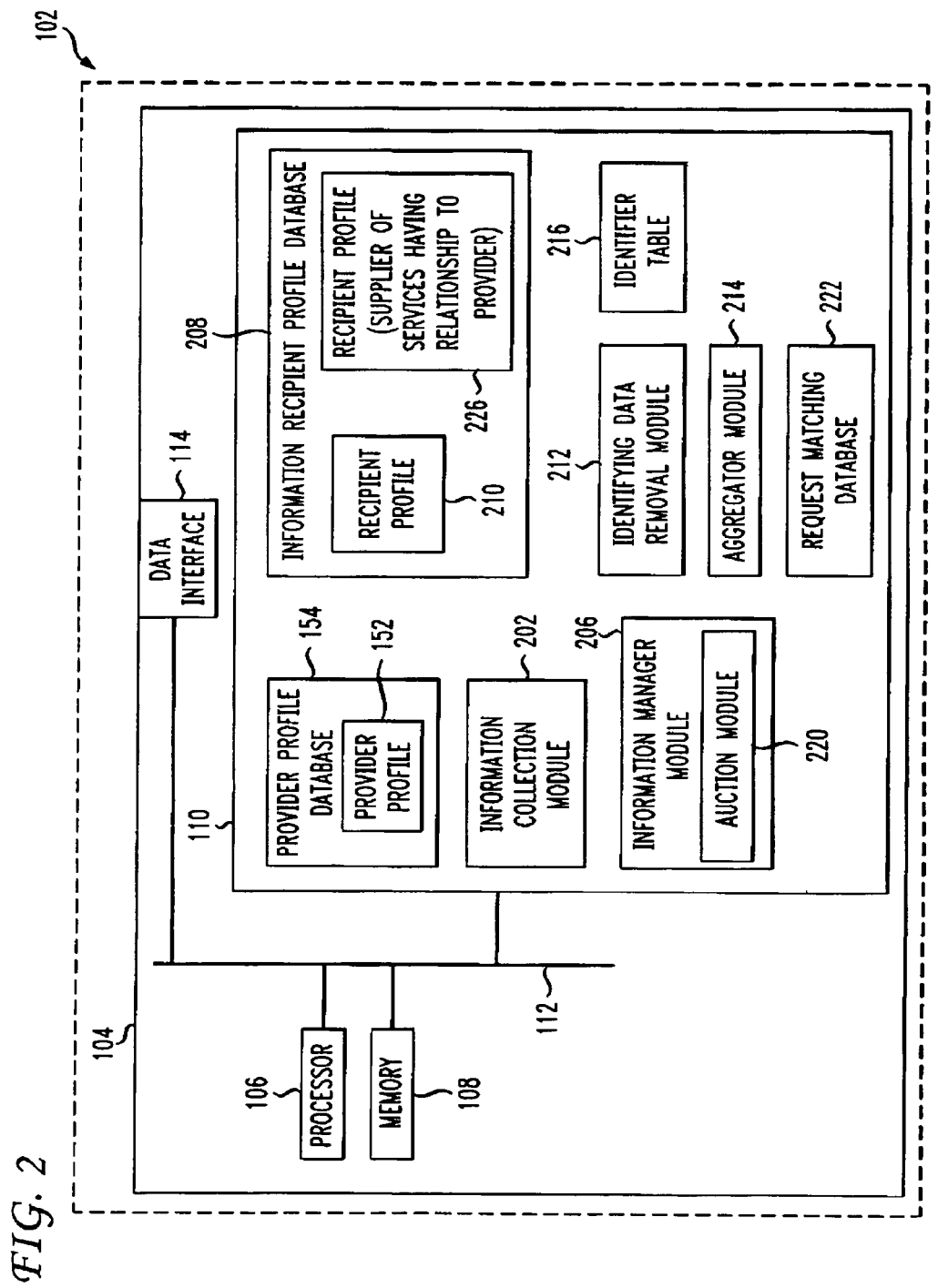
FIG. 2 illustrates additional details of the system of FIG. 1, including elements for collecting, storing, and exchanging information according to specified criteria according to an aspect of the present invention.

FIG. 2 illustrates additional details of the information management center 102. The information management center 102 includes the server 104, including the processor 106, memory 108, storage 110, bus 112, and data interface 114. As noted above, the server 104 hosts the user profile 152, stored in the user profile database 154. The server 102 hosts a number of executable modules to perform its functions, with these modules suitably stored as software in the storage 110 and transferred to memory 108 as needed for execution by the processor. An information collection module 202 maintains and adds data to a user profile for each user. In the present exemplary case, this is the user profile 152. The user profile may be initiated by the data collection module 202, which may provide an interface displayed through the computer 120, allowing the user to designate categories of information that may be collected, the sources from which information may be taken for collection, the level of access to be given to the different categories, and the classes of recipients that may have access to the information. Access to categories or specific elements of information may be based partly or wholly on the price that a recipient is willing to pay for the information, and the price dependence of the information will be used in an information marketplace managed by the information management center 102, as discussed in greater detail below. The choices available to the provider may include default choices supplied for the convenience of the provider, but able to be changed either at initiation of the profile 152 or at a later time. The choices made by the provider are used to establish criteria for the collection and sharing of information, with these criteria being stored in a table 204 in the profile 152.

Once the criteria for information collection have been established, incoming information from information sources is identified as being associated with the provider and collected and stored in the profile 152. Information may be received from sources such as the computer 120, the data processing center 132 serving the broadband center 131, the wireless device 146 and the control center 128 serving the wireless provider 127, the distribution center 140 serving the entertainment provider 138, and the data processing center 126 serving the telephone system 122. Information may include indications as to its source and type, assigned by the source of the information and used by the collection module 202 to add classification information to each stored information element or group of elements. Data providing details about when and how the information elements were collected, and otherwise relevant to the collection of information elements, may include the time of generation and mechanism of generation, such as through provider interaction services such as online or television services, wired or wireless communications, or the like. Further data may include whether the information relates to provider ratings of goods or services, or was generated through provider entries to a mobile device such as the wireless device 146. The collection module 202 appropriately classifies and stores data in the profile 152, with part of the classification process including assigning sensitivities to various elements of information. The provider may review sensitivities and classifications as desired, and the collection module 202 may be designed so as to refine its classification procedure based on provider activity. For example, if the provider changes the classification of a data element from that automatically assigned by the collection module 202, such a change may be noted and may influence the automated classification of similar information elements in the future.

The server 104 also hosts an information manager module 206. The information manager module evaluates information recipients and provides information to the recipients according to criteria specified by or acceptable to the provider. The information manager module 206 provide mechanisms for identifying and authenticating information recipients, and may suitably maintain information recipient data in an information recipient profile database 208, with the database 208 storing a plurality of information recipient profiles such as the profile 210. The profile 210 and similar profiles store appropriate information related to the information recipients with which they are associated, suitably including information identifying the information recipient and providing for appropriate authentication. Information stored in a recipient profile may also suitably include information identifying the nature of the recipient, the types of information typically desired by the recipient, and the uses to which it puts the information. The profile of an information recipient may also store complaint or warning information which may be received by an operator of the system 100 through its own monitoring activities, through public reports of improper activities of information recipients, and from complaints by information providers. The profile of an information recipient may also include financial or credit information used to provide assurance of payment for information.

Large institutions, which may be frequent recipients of information, may provide well known indicia of authenticity. For example, an organization may agree with an operator of the system 100 that all requests will originate from a known address, and it may use security certificates employing a public key/private key pair whose public key is known to belong to the organization. In addition, recipients of information may be expected to provide value for the information they use, and the financial information stored in a recipient profile for such an organization may reflect a deposit with an operator of the system 00, or access to funds or credit that will be taken under control by the operator of the system 100 upon conclusion of an information sharing transaction.

In addition to identifying and authenticating recipients, the information manager module 206 may assign degrees of assurance associated with the identification and authentication of recipients. Such degrees of assurance may suitably be represented by confidence scores, with higher or lower confidence scores representing higher or lower degrees of confidence in the authenticity and reliability of an information recipient. Such confidence scores may be used by the information manager module 106 to allow or deny recipients access to particular categories of information, or to determine whether to allow recipients to use the system 100, and also may be provided to information providers for use in determining whether to share information.

For some categories of information, such as aggregated statistical information associated with product rating activity, a provider may not be concerned with the identity of the recipient of the information, because the information is difficult to misuse in any way that might harm the provider. In addition, some providers might accept greater or lesser degrees of risk of misuse, depending on the nature of the information, and might accept higher degrees of risk in exchange for higher payments. However, the information manager module 206 may exclude some categories of information, such as individual medical information or financial information, from use by recipients who are not known with a high degree of confidence to be reliable and to have a legitimate interest in the information, regardless of how much risk the provider may be willing to accept. For example, individual medical information may be accessible only to physicians and other medical providers, or only to specific physicians and medical providers associated with the information provider. In addition, the information manager module 206 may assign a level of protection to be assigned to categories information when a provider has failed or declined to choose a level of protection for the category. In one embodiment, for example, the information manager module 206 may establish default levels of protection that must be explicitly changed by a provider, and may suitably assign a relatively high level of protection as the default level, particularly to information that includes personally identifiable data.

The information manager module 206 has access to an identifying data removal module 212 and an aggregator module 214. One useful form of information is aggregated information from a number of providers, relating to interests and activities of the providers. Such information can be collected from providers meeting specified criteria, such as living in a particular region, belonging to a particular demographic or income group, or belonging to various social or interest groups. Information relating to provider activities may be aggregated and used to direct product development or marketing efforts. Such information may include rating information, with rating information adding significant useful details relating to the reception of products or services in the marketplace. The information manager module 206 may retrieve appropriate information from the profile 152 and other profiles and pass this information through the identifying data removal module 212. The identifying data removal module 212 removes personally identifying data from each element of collected information, and the information of interest, such as interests purchase, activity, or preference information, or the like, is passed to the aggregator module 214. The information passed to the aggregator module 214 under these circumstances, therefore, identifies the activities and transactions, and various information elements such as demographic status and interests, but does not identify the specific person with whom this information is associated. Demographic information may also be processed so as to effectively prevent it from being used to identify the person from whom it was taken.

The information manager module 206 may replace identifying information with an anonymous identifier, which may be correlated with identification of the provider from whom it was taken, for example, in an identifier table 216, in order to properly direct payment to the provider. Such information is held securely to prevent its misuse, and such information is not shared with information recipients. Alternatively or in addition, sharing of information may be initiated by a request from a recipient, with the recipient being identified to the information manager module 206 and a notation being made in a user profile such as the profile 152 whenever information is supplied in response to a request, so that payment can be directed from the proper recipient to the proper provider.

After identifying data has been removed, information may be passed to the aggregator module 214, which may process the information and provide results of the processing to interested recipients. If desired, various sets of aggregated information and results of processing such information may be held and supplied to interested recipients, such as in an aggregated information database 218, with the providers from whom the information was taken being appropriately compensated whenever such information is used.

Some interested recipients may wish to receive personally identifiable information. Such personally identifiable information may be used, for example, to market products or services directly to the providers. In such cases, the information manager module 206 may collect appropriate information from providers to whom such use is acceptable and handle the information as directed by the recipients. For example, information may be aggregated and processed to predict the responsiveness of particular identified providers to marketing efforts or to products offered by information recipients, and the information recipients may direct marketing efforts toward these identified information providers.

The information manager module 206 may facilitate a marketplace for information, allowing recipients and providers to make entries describing the type of information to be shared and acceptable pricing for the information. The information manager module 206 may include an auction module 220, which may accept requests, or which may survey profiles for requests and conduct transactions when matching requests are found. For example, a marketing firm may desire transaction history information from 100,000 providers in a particular income group, family size, and geographic region, and may be willing to pay ten cents per provider for information without identifying characteristics. The information manager module 206 may store this information in a request matching database 222, and the auction module 220 may survey the request matching database 222 for offers to share information that match the request, and may also survey the provider profile database 154 for qualifying providers. Each provider profile may include indications of the conditions with which various categories of information will be shared, with one of the possible conditions being the amount a recipient is willing to pay for the information. Preferably, among qualifying providers, those requesting lower payment for information will be chosen before those requesting higher payment. Therefore, if 100,000 providers can be found that meet the standards specified by the recipient and require payment of only 5 cents for information that does not identify a specific individual, these 100,000 will be paid 5 cents each, regardless of the fact that the recipient would have been willing to pay 10 cents each. If varying payment requirements are found among a population meeting the requirements of the recipient, the providers requiring lower payments will be chosen first.

To take another example, a provider may issue offers to share information, designating the types of information to be shared and the compensation desired. Such requests may be stored in the request matching database 222, and the auction module 220 may survey the request matching database 222 for requests matching the offer, and may also survey recipient profiles for indications that recipients have needs for information matching the offer and are willing to pay compensation matching the offer. Once matching requests are found, appropriate information is retrieved from the provider and shared with recipients having matching needs.

To take still another example, the auction module 220 may simply survey provider profiles and recipient profiles for matching needs without a requirement for a formal request. This may be particularly useful in the ease of large entities with ongoing needs for information, to which payments for information will not represent a large expenditure. For example, a restaurant chain may have an ongoing need for ratings of its restaurants and may store information relating to this need in its profile. Providers rating restaurants may be surveyed on an ongoing basis and ratings of the restaurant chain in question may be furnished to the restaurant chain in exchange for appropriate compensation.

In another example, the system 100 may be used to compile and store information for a provider and allow retrieval of the information by the provider as desired. Criteria for the use of a provider's own information may be stored in a provider profile such as the provider profile 152, and the provider's information may be released as indicated. Typically, an adult provider will store criteria allowing fill access to his or her own information, but in the case of a family, different family members may be granted different levels of access to information for other family members. In addition, children may be granted limited access to information according to criteria set by their parents. Various uses to which information might be put could include storage of household, financial, medical, and school information, and other information useful to members of the household. Information might be simply stored, or it could be processed in various ways. For example, ratings of products or entertainment experiences could be processed for use in providing recommendations for other products or entertainment experiences.

Many providers of information may also be recipients of the information of others. Many individual persons may be willing to consume the information of others in exchange for sharing information of their own. At registration, this possibility may be presented to a provider, who may be given an opportunity to create a recipient profile that may be placed in the recipient profile database 208.

The operation of the system 100 may be illustrated by an example. Consider the case of a family receiving telephone services, wireless communication services, television services, and broadband services, from the telephone service provider 122, the wireless communication system 127, the broadband provider 131 and the entertainment provider 138, respectively. These service providers all supply information to the family, and are also capable of furnishing information to the information management center 104 on behalf of the family. A family representative subscribes to an information sharing service provided by the system 100 through an interface or series of interfaces generated by the collection module 206 and transmitted to the computer 120. The interfaces accept user inputs establishing a subscription to the information sharing service, with initial subscription resulting in establishment of the user profile 152. As part of the subscription process, selections are made authorizing collection of information from various services and parties storing information relating to members of the family. These may include the telephone service provider 122, the wireless system 127, the broadband provider 131 and the entertainment provider 138, supplying information using the telephone data processing center 126, the wireless communication control center 128, the broadband server 134, and the data processing and communication system 142. These facilities may provide services to many persons subscribing to services provided by the system 100, and provide connections to the data management center 104 as shown and as discussed above. Upon subscription, authorization to furnish information to the data management center 104 is stored in the provider profile 152, and this authorization is furnished to the various entities from whom collection of information is authorized. In the present exemplary case, the telephone data processing center 126, the wireless control center 128, the broadband server 134, and the data processing and communication system 142 are authorized to furnish information to the data management center 104. Additional parties may also be authorized to furnish information. These may include financial service institutions, membership organizations, merchants, interest organizations, social clubs, physicians, and numerous other parties and organizations.

Suitably, the profile 152 includes entries and stores information for all family members, and each member may specify what information is to be gathered and shared, subject to controls to protect children. A family representative, or each family member for himself or herself may also enter additional profile information, such as demographic and interest information, and the profile 152 may be updated as desired.

The data collection module 206 periodically surveys the various devices and entities authorized to furnish information relating to the family identified in the profile 152 and updates the profile 152 as new information is received. The information that is received may include information furnished by use of the wireless device 146 as an information collection device. In a typical day, the user of the wireless device 146 may leave the house at 6:30 AM, visit a coffee shop and purchase a medium coffee for $1.75 and a scone for $1.50 for a total of $3.25, paying with an American Express card. The user may enter a rating of "excellent" for the coffee and the scone, "good" for the service, and "good" for the overall experience. The travel to and visit in the coffee shop, the name of the coffee shop, the purchase, and the rating, are all recorded. The user then travels to work, remaining until lunchtime, then visits a nearby café and orders a chef's salad for $6.50 and tea for $2.00, rating the salad "fair" and the tea "good", the service "excellent" and the overall experience "good". The user then returns to work, leaves work in the afternoon, then visits a bar, ordering a white wine for $6.00, rating it "excellent," the service "excellent," and the overall experience "excellent." The user then watches a movie, paying $20.00 for two tickets and purchasing concessions for $13.00, rating the movie as "good," the seating as "excellent," the concessions as "fair," and the overall experience as "good." The user then returns home. Depending on the particular design of the system 100, this information may have been delivered to the data management center 102 continuously as generated, or may be transferred automatically at prescribed intervals or upon direction by the user. Transfer may be accomplished through a wireless connection with the control center 128, or through a wired or wireless connection with the computer 120, which may then transfer appropriate data to the information management center 102.

The information management center 102 makes information available to recipients according to restrictions and preferences stored in the profile 152. For example, in the present exemplary case, the family physician has a recipient profile 226, and has privileges to review stored medical information. The husband is a member of a science fiction group, and information recipients who are members of the same group are given privileges to receive information relating to ratings of science fiction books and movies entered by the husband.

Among other information included in the user profile 152 is extensive information relating to restaurant dining at various price levels, purchases of entertainment technology, and use of media services such as DVD rentals, pay per view movies, and online music. The user profile 152 also includes the information that the family has purchased a new family car, and has taken a foreign trip of two weeks in the past year. The family has elected to make this information available to providers of goods and services having an interest in the information, and has set desired payment rates for the information.

The information management module 206 periodically surveys the user profile 152 and similar user profiles, and recipient profiles stored in the database 208, and matches requests for information against conditions for sharing information. In the present example, a travel services company wishes to market travel packages to parties matching a profile, and will pay $2.00 for such an opportunity. The information management module 206 examines a recipient profile 228 for the travel company and determines that the profile 152 matches its requirements. The family matches the characteristics specified by the travel company as purchasers of travel, and requires a payment of $1.50 for sharing identifiable information with authenticated merchants. The information management module 206 extracts appropriate information from the user profile 152 and shares it with the travel provider, debiting a deposit account of the travel provider and crediting a family payment account.

To take another example, a science fiction movie vendor wishes to receive rating information collected from science fiction movie fans for use in a recommender system. The same information that is designated in the profile 152 for sharing free with fellow fans is designated as being sharable with vendors for a fee of 25 cents per 100 ratings. The movie vendor submits a request for information to the information manager module 206 and the information manager module identifies the rating information stored in the profile 152 as meeting the specified criteria and invokes the auction module 220 to match providers with the movie vendor based on price. The movie vendor requires 100,000 ratings and is willing to pay 40 cents per 100 ratings. The auction module 220 finds 20,000 ratings at 15 cents per 100, 20,000 ratings at 20 cents per 100, 40,000 ratings at 25 cents per 100 and 20,000 ratings at 30 cents per 100. Additional ratings are available at higher prices which are still within the maximum price payable by the movie vendor, but these are not needed. The profile 152 includes 150 ratings, which are used in response to the request and a payment of 37.5 cents is debited from the movie vendor and credited to the provider family. Before being delivered, the ratings are passed to the identifying data removal module 212, but they are desired for individual use, so they are not processed by the aggregator 214.

FIG. 3 illustrates a process 300 of information collection and exchange according to an aspect of the present invention. The process 300 may suitably be practiced using a system such as the system 100 of FIG. 1, employing an information management center 102 such as the center 102 of FIGS. 1 and 2. At step 302, suitably on an ongoing basis, accounts are established for one or more information providers and recipients. Establishment of an account may include presenting an interface to a person or entity and receiving identity and preference information, with the identity and preference information including authentication information and techniques, mechanisms and sources for information collection and criteria for information sharing in the case of providers, and requirements for and uses of information and verification of payment mechanisms for information in the case of recipients. At step 304, provider and recipient profiles are established, storing information for each provider and recipient for whom an account has been established. At step 306, on a periodic basis or as initiated by a provider or recipient, the profile of one or more of the providers and recipients is modified to reflect changing circumstances such as additional sources of information or new preferences for information to be collected, received, or shared. At step 308, information is gathered for one or more providers and stored in the provider profile for that provider. Such gathering of information may be accomplished, for example, from sources supplying media and communication to the provider, from entities having a relationship with the provider, from entries made by the provider, or from other suitable sources. At step 310 upon request by a recipient for information, the profile of the recipient is examined and the nature of the information requested is identified. At step 312, provider profiles are surveyed and those matched to the recipient request are identified, suitably based on factors such as correspondence of the information to the request, authorization of the recipient to receive the information based on provider criteria, and sufficiency of the payment offered by the recipient based on the requirements of the provider. At step 314, information matching the request is delivered to or used to generate results for the recipient. Such delivery or use may involve removal of identifying data, as well as aggregation to generate results such as average ratings or popularity or interest measures. At step 316, appropriate compensation is transferred from the recipient to the provider.

At step 318, recipient profiles are periodically surveyed even in the absence of a specific request, and provider profiles are similarly surveyed for information matching needs expressed in the recipient profiles. At step 320, upon identification of information matching specified needs, information is delivered or used to generate results as appropriate, and transfer of compensation is made.

While the present invention is disclosed in the context of a presently preferred embodiment, it will be recoginzed that a wide variety of implementations may be employed by persons of ordinary skill in the art consistent with the above discussion and the claims which follow below.

We claim:

1. A method of management of information sharing, comprising:
   in a processor of an information management center, collecting provider information associated with one or more of a plurality of information providers, the provider information being associated with specifications of two or more criteria for sharing of the provider information, the criteria including payment required by a provider for sharing the provider information of that provider, the criteria further including a first payment amount required for sharing the provider information wherein the provider information includes information personally identifying the information provider, and a second payment amount, different from the first payment amount, required for sharing the provider information wherein the provider information does not include the information personally identifying the information provider;
   in a processor of the information management center, collecting information recipient data from one or more of a plurality of information recipients, the information recipient data including recipient needs of each recipient for provider information and payment that each recipient is willing to provide for provider information meeting those needs;
   in a processor of the information management center, periodically surveying the information recipient data and the provider information in the absence of a specific request from the recipients between periodic surveys to select provider information meeting specified recipient needs, selection of provider information including identifying provider information meeting recipient needs based on the criteria for sharing of the provider information, selection of provider information including identifying the payments required by providers that meet the payments that recipients are willing to provide; and
   delivering provider information to recipients based on identified recipient needs and provider information;
   wherein, when recipient needs include information from a plurality of providers and wherein information is available from more providers than required, selecting information from those providers from whom required payment is lowest until the recipient needs are satisfied;
   wherein collecting provider information associated with one or more of a plurality of information providers comprises:
      tracking a position of an information provider using data from a global positioning system receiver;
      determining a visit to an establishment by the information provider by determining that the position of the information provider has stopped at a particular location; and
      after the visit by the information provider, presenting to the information provider a reminder including a name of the establishment and a request to provide a rating of the establishment.

2. The method of claim 1, wherein collecting provider information includes providing a registration facility allowing a provider to register for information sharing, to specify sources of information relating to that provider, and to specify criteria for sharing of information for that provider.

3. The method of claim 1, wherein criteria for sharing provider information include different criteria for different classes of recipients.

4. The method of claim 1, wherein criteria for sharing provider information include levels of protection based on provider selections.

5. The method of claim 4, wherein criteria for sharing provider information include default levels of protection that apply unless explicitly changed by a provider.

6. The method of claim 1, wherein criteria for sharing provider information include protection of sensitive categories of information from disclosure to recipients that have not been determined with a specified assurance to be reliable.

7. The method of claim 3, wherein criteria for sharing provider information include sharing information related to an interest of the provider with a provider's fellow members of an interest group in exchange for information of those fellow members related to the same interest.

8. The method of claim 1, wherein collecting provider information includes receiving information collected by a mobile device recording a provider's movements and activities.

9. The method of claim 1, further comprising aggregating information from a plurality of providers and computing results based on that information for delivery to one or more recipients.

10. The method of claim 1, further comprising removing provider information before delivery to a recipient.

11. A non-transitory computer-usable medium having computer readable instructions stored thereon for execution by a processor to perform operations for management of information sharing, comprising:
   collecting provider information associated with one or more of a plurality of information providers, the provider information being associated with specifications of two or more criteria for sharing of the provider information, the criteria including payment required by a provider for sharing the provider information of that provider, the criteria further including a first payment amount required for sharing the provider information wherein the provider information includes information personally identifying the information provider, and a second payment amount, different from the first payment amount, required for sharing the provider information wherein the provider information does not include the information personally identifying the information provider;

collecting information recipient data from one or more of a plurality of information recipients, the information recipient data including recipient needs of each recipient for provider information and payment that each recipient is willing to provide for provider information meeting those needs;

periodically surveying the information recipient data and the provider information in the absence of a specific request from the recipients between periodic surveys to select provider information meeting specified recipient needs, selection of provider information including identifying provider information meeting recipient needs based on the criteria for sharing of the provider information, selection of provider information including identifying the payments required by providers that meet the payments that recipients are willing to provide; and delivering provider information to recipients based on identified recipient needs and provider information;

wherein, when recipient needs include information from a plurality of providers and wherein information is available from more providers than required, selecting information from those providers from whom required payment is lowest until the recipient needs are satisfied;

wherein collecting provider information associated with one or more of a plurality of information providers comprises:

tracking a position of an information provider using data from a global positioning system receiver;

determining a visit to an establishment by the information provider by determining that the position of the information provider has stopped at a particular location; and after the visit by the information provider, presenting to the information provider a reminder including a name of the establishment and a request to provide a rating of the establishment.

12. The non-transitory computer-usable medium of claim 11, wherein collecting provider information includes providing a registration facility allowing a provider to register for information sharing, to specify sources of information relating to that provider, and to specify criteria for sharing of information for that provider.

13. The non-transitory computer-usable medium of claim 11, wherein criteria for sharing provider information include different criteria for different classes of recipients.

14. The non-transitory computer-usable medium of claim 13, wherein criteria for sharing provider information include sharing information related to an interest of the provider with a provider's fellow members of an interest group in exchange for information of those fellow members related to the same interest.

15. The non-transitory computer-usable medium of claim 11, wherein criteria for sharing provider information include levels of protection based on provider selections.

16. The non-transitory computer-usable medium of claim 15, wherein criteria for sharing provider information include default levels of protection that apply unless explicitly changed by a provider.

17. The non-transitory computer-usable medium of claim 11, wherein criteria for sharing provider information include protection of sensitive categories of information from disclosure to recipients that have not been determined with a specified assurance to be reliable.

18. The non-transitory computer-usable medium of claim 11, wherein collecting provider information includes receiving information collected by a mobile device recording a provider's movements and activities.

19. The non-transitory computer-usable medium of claim 11, further comprising aggregating information from a plurality of providers and computing results based on that information for delivery to one or more recipients.

20. The non-transitory computer-usable medium of claim 11, further comprising removing provider information before delivery to a recipient.

\* \* \* \* \*